(12) United States Patent
Potts

(10) Patent No.: US 10,287,197 B2
(45) Date of Patent: *May 14, 2019

(54) WASTEWATER TREATMENT SYSTEM

(71) Applicant: David A. Potts, Killingworth, CT (US)

(72) Inventor: David A. Potts, Killingworth, CT (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/213,475

(22) Filed: Jul. 19, 2016

(65) Prior Publication Data

US 2016/0326033 A1 Nov. 10, 2016

Related U.S. Application Data

(63) Continuation of application No. 14/214,699, filed on Mar. 15, 2014, now Pat. No. 9,403,692.

(60) Provisional application No. 61/790,990, filed on Mar. 15, 2013.

(51) Int. Cl.
| | |
|---|---|
| *C02F 3/28* | (2006.01) |
| *C02F 1/00* | (2006.01) |
| *E03F 1/00* | (2006.01) |
| *C02F 3/04* | (2006.01) |
| *C02F 3/00* | (2006.01) |
| *C02F 3/30* | (2006.01) |
| *C02F 103/00* | (2006.01) |

(52) U.S. Cl.
CPC .............. *C02F 3/288* (2013.01); *C02F 1/004* (2013.01); *C02F 3/006* (2013.01); *C02F 3/046* (2013.01); *C02F 3/286* (2013.01); *C02F 3/306* (2013.01); *E03F 1/002* (2013.01); *C02F 2001/007* (2013.01); *C02F 2103/005* (2013.01); *C02F 2209/03* (2013.01); *C02F 2209/42* (2013.01)

(58) Field of Classification Search
CPC .. E03F 1/00; E03F 1/002; C02F 3/046; C02F 3/286; C02F 3/288; C02F 3/306
USPC ......... 210/170.08, 532.2; 405/38, 43, 45, 50
See application file for complete search history.

(56) References Cited

U.S. PATENT DOCUMENTS

| | | | |
|---|---|---|---|
| 3,698,194 A | 10/1972 | Flynn | |
| 4,023,506 A * | 5/1977 | Robey | E01C 13/083 405/43 |
| 4,303,350 A | 3/1981 | Dix | |
| 4,971,690 A | 11/1990 | Justice | |
| 5,078,882 A | 1/1992 | Northrop | |
| 5,534,147 A | 7/1996 | Kallenbach | |
| 5,954,451 A | 9/1999 | Presby | |
| 6,018,909 A | 2/2000 | Potts | |
| 6,428,239 B1 | 8/2002 | Davis | |
| 6,485,647 B1 | 11/2002 | Potts | |
| 6,540,910 B2 | 4/2003 | Scharznegger | |
| 6,562,236 B2 | 5/2003 | Ryland | |
| 6,726,401 B1 | 4/2004 | Potts | |
| 6,814,866 B1 | 11/2004 | Potts | |
| 6,887,383 B2 | 5/2005 | Potts | |

(Continued)

OTHER PUBLICATIONS

EPA Design Manual "Onsie Wastewater Treatment and Disposal Systems" Oct. 1980.
Jose A. Amador et al., "Evaluation of Leachfield Aeration Technology for Improvement of Water Quality and Hydraulic Functions in Onsite Wastewater Treatment Systems," NOAA/UNJ CICEET, Sep. 2, 2007.

(Continued)

*Primary Examiner* — Christopher Upton
(74) *Attorney, Agent, or Firm* — Grasso PLLC

(57) ABSTRACT

Treatment of wastewater containing contaminants is provided. More specifically, treating wastewater through capture and recirculation of percolated fluid effluent through and from one or more infiltration field systems is provided.

19 Claims, 9 Drawing Sheets

(56) References Cited

U.S. PATENT DOCUMENTS

| | | | |
|---|---|---|---|
| 6,923,905 B2 | 8/2005 | Potts | |
| 6,959,882 B1 | 11/2005 | Potts | |
| 6,969,464 B1 | 11/2005 | Potts | |
| 7,157,011 B1 | 1/2007 | Potts | |
| 7,309,434 B2 | 12/2007 | Potts | |
| 7,351,005 B2 | 4/2008 | Potts | |
| 7,374,670 B2 | 5/2008 | Potts | |
| 7,465,390 B2 | 12/2008 | Potts | |
| 7,510,649 B1 | 3/2009 | Lavigne | |
| 7,744,759 B1 | 6/2010 | Potts | |
| 8,021,551 B2 | 9/2011 | Harrison | |
| 9,403,692 B2* | 8/2016 | Potts | C02F 3/286 |
| 2006/0011530 A1 | 1/2006 | Kim | |
| 2007/0289922 A1 | 12/2007 | de Guevara | |
| 2011/0174706 A1 | 7/2011 | Russell | |
| 2011/0284477 A1* | 11/2011 | Presby | C02F 3/046 |
| | | | 210/170.01 |
| 2012/0024766 A1 | 2/2012 | McKinney | |
| 2012/0187031 A1* | 7/2012 | Beatt | E03F 1/002 |
| | | | 210/170.03 |

OTHER PUBLICATIONS

Jose A. Amador et al., "Effects of Sand Depth on Domestic Wastewater Renovation in Intermittently Aerated Leachfield Mesocosms," Journal of Hydrologic Engineering, Aug. 2008.

Geomatrix, "GeoMat High performance, low profile, wastewater infiltration and reuse systems," Brochure 2008.

SoilAir Systems, Brochure.

Jose A. Amador et al. "Breath of Fresh Air," Project Brief, CICEET.

Brochure, "AdvanEDGE Pipe—Engineered panel pipe for superior quick-response drainage" Advanced Drainage Systems, Inc., Hilliard, OH, Apr. 2001.

Brochure, RainStore3—Invisible Structures.com, 2003-2005.

Webpage, Surefoot4.

Brochure, Slopetame2—Invisible Structures, Inc. 2007.

Hepner, et al. "Alternative On-Lot Technology Research, Soil-Based Treatment Systems" Delaware Valley College, Oct. 29, 2005.

Potts et al. "Effects of Aeration on Water Quality from Septic System Leachfields," J. Environ. Qual., 33:1828-1838, 2004.

* cited by examiner

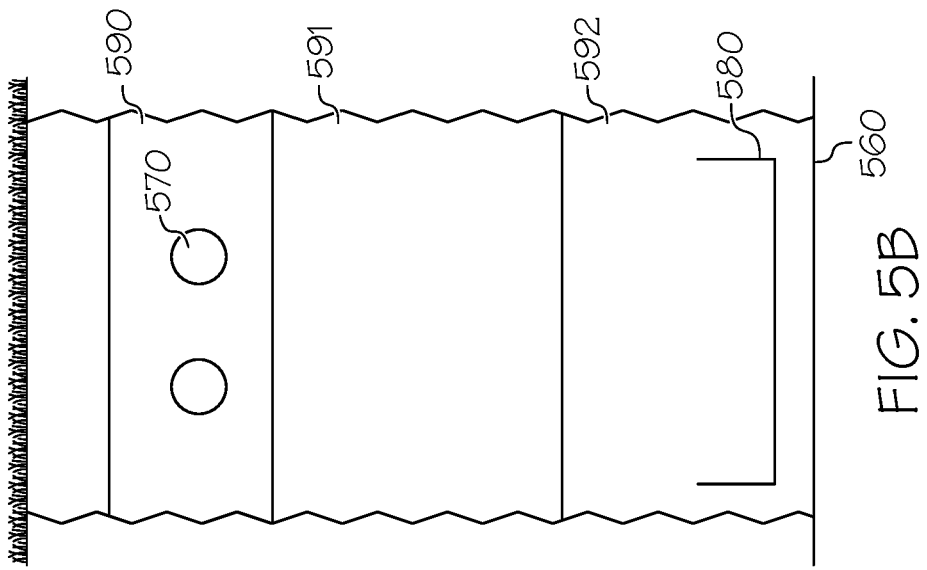
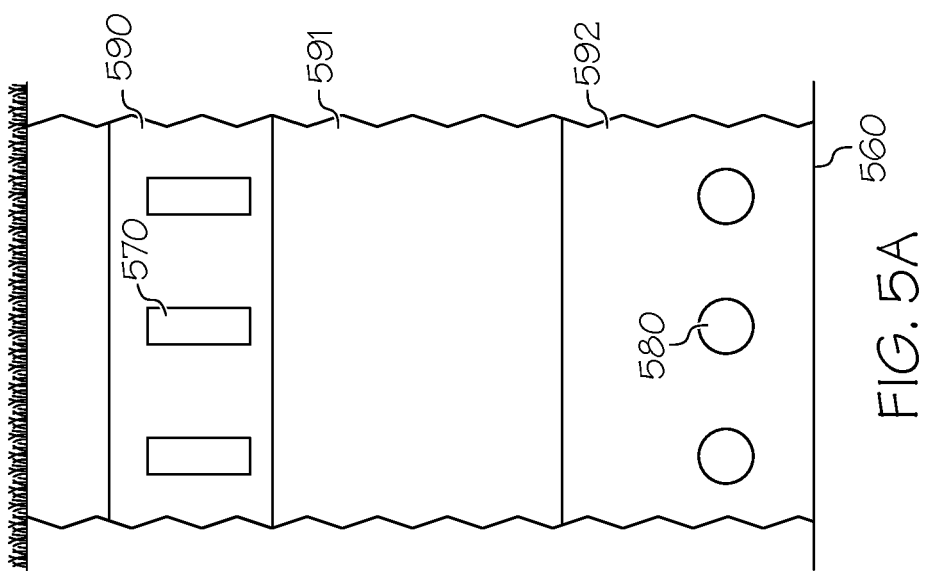

WASTEWATER TREATMENT SYSTEM

CROSS-REFERENCE TO RELATED APPLICATION

This application in a continuation of U.S. patent application Ser. No. 14/214,699, which was filed on Mar. 15, 2014, is entitled Wastewater Treatment System, and is scheduled to issue as U.S. Pat. No. 9,403,692. The '699 application claims priority to and the benefit of U.S. Provisional application 61/790,990, which was filed Mar. 15, 2013 and is entitled Wastewater Treatment System. The '699 application and the '990 provisional are incorporated by reference, in their entirety, into this application.

FIELD OF THE INVENTION

Treatment of wastewater containing contaminants is provided. More specifically, treating untreated, partially-treated, and fully-treated wastewater through collection and recirculation of wastewater from one or more infiltration fields is provided.

BACKGROUND

Wastewater systems vary in size and scope. They can be sized for treatment of large amounts of wastewater from a municipality or other large cumulative systems for benefitting many residences, businesses, and industrial facilities serviced by the municipality. The wastewater system can also be designed and sized for single home residential use and small scale residential and commercial uses.

In the small scale applications, the system will often include a septic tank that can receive wastewater and allow for solids from the wastewater to settle out. The system will also often include an infiltration field downstream of the septic tank for receiving the wastewater from the septic tank and for discharging the wastewater. The discharge is often made from pipes lying atop a bed of material laid for receipt of the wastewater.

BRIEF SUMMARY

Process, apparatus, systems, and articles of manufacture are provided for wastewater handling or treatment or both. Embodiments can include recirculative wastewater treatment systems where wastewater that has moved through a treatment media is collected and recirculated back into the system. In embodiments the leaching field may be lined and may also contain collectors, where each collector and the liner itself may be for capturing wastewater from leaching sources that has moved through a treatment media. In embodiments leach field conduits may themselves be intermingled among each other, much like tines from two combs intersecting each other. In embodiments the collectors or the liners or both may be positioned beneath the leach field conduits and may be sized and configured to capture a portion of the wastewater that has left the leaching conduits and has traveled through treatment media. A percentage of system wastewater may be captured to permit recharge of the environment around the leach field and also for providing a suitable amount of recirculation of wastewater back into the treatment system. The distance that the wastewater travels from the leach field, through treatment media, and into the collectors may be adjusted to manage the level of treatment of the wastewater entering the system as well as the amount of wastewater recirculated back into the system.

Throughout the disclosure it should be understood that the wastewater travelling into and through the embodiments can have changing levels of contaminants where the level of contamination for the wastewater may diminish as it moves through the treatment train. Thus, the level of contaminants in the wastewater after is has left the leaching conduits and travelled through the treatment media may be far less than the level of contaminants in the wastewater when it is first introduced into the system for the first time. This use of the word wastewater is intended to assist the reader and simplify references throughout the disclosure. In addition, the wastewater disclosed herein may include waste related to human waste and may be originating at a single residence or commercial location, or from an accumulation of residences and commercial locations, as may be done locally as well as at an industrial wastewater treatment facility.

The collectors and liners of embodiments may be partially or fully filled with a receiving media, and preferably a source of carbon such as wood chips, saw dust, corn husks and corn stalks. The receiving media may promote further treatment of the collected wastewater, absorption of the collected wastewater, and may be replenished from time to time. This replenishment may be accomplished through cleanouts that provide access to the collectors and any liner. Collected wastewater may be recirculated back into upstream locations of the system by using vacuums, blowers, pumps, and other recirculative devices. These recirculative devices may promote recirculation of the collected wastewater by moving wastewater itself, water vapor, and gas with the wastewater.

In embodiments the leach field conduits may be connected and oriented into zones that overlap each other. Through the overlap of zones and distinct spacing between leach field conduits, distinct leach fields may share overlapping treatment media and may, thus, occupy less overall square footage than if they each occupied their own distinct area. In embodiments, spacing between conduits of leach fields from different zones may be substantially 10" or more and may be as large as 144" or more.

Numerous embodiments are possible beyond those specifically described herein. The embodiments described here are illustrative and should not be considered to be limiting. This includes that processes described herein may be undertaken in various orders unless specifically called for in the applicable claim or description. Moreover, fewer or more features or actions may accompany those specifically described herein. Likewise, disclosed embodiments may be further modified, including being altered using features and processes selected from different embodiments and using features and processes in different orders and configurations.

BRIEF DESCRIPTION OF THE SEVERAL VIEWS OF THE DRAWINGS

FIGS. 5A-5B show sectional views of subsurface conditions in a leach field as may be employed in accord with embodiments.

DETAILED DESCRIPTION

Figure 1:
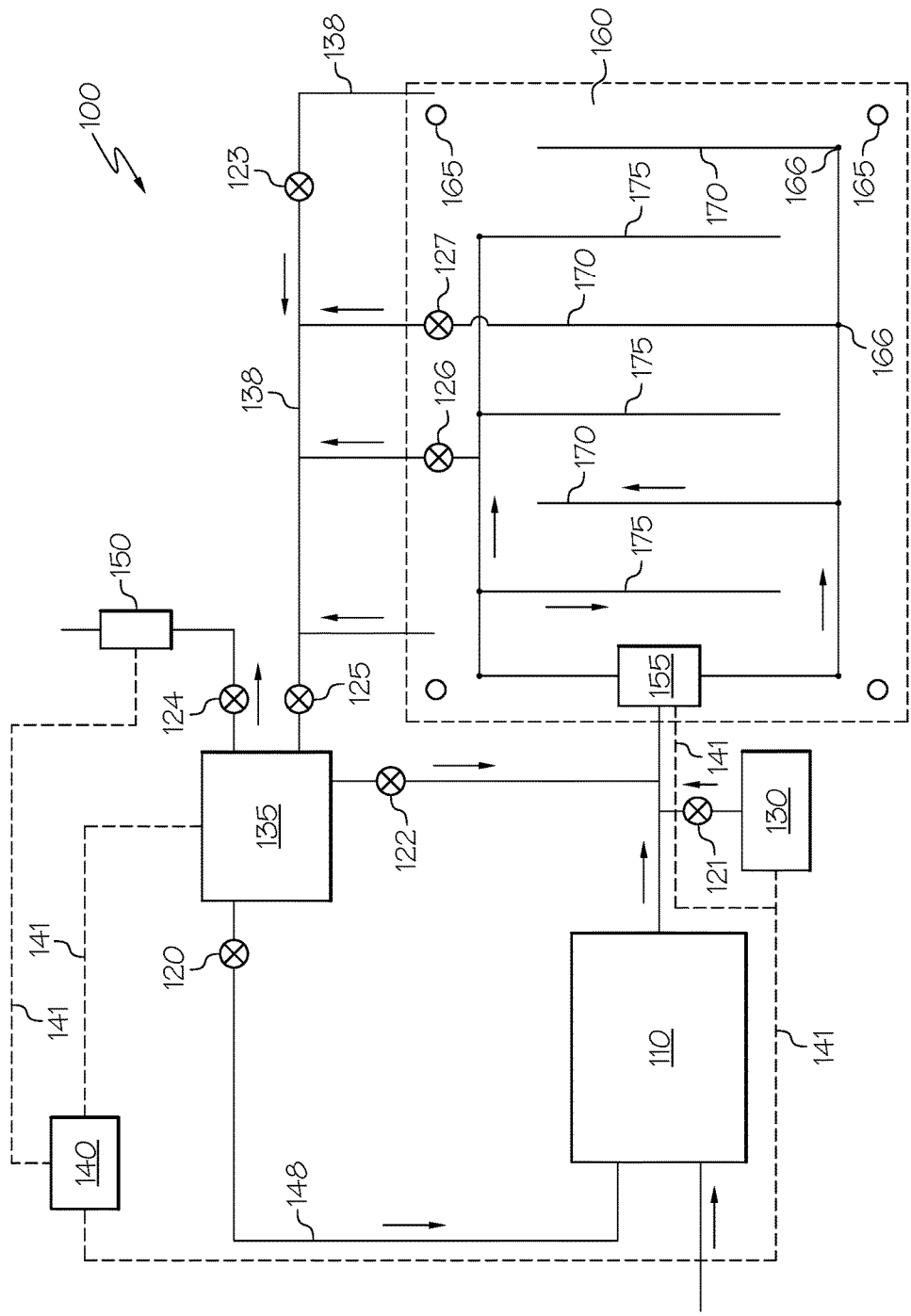
FIG. 1 is a plan view of a schematic of a wastewater treatment system as may be employed in accord with embodiments.

Process, apparatus, systems, and articles of manufacture are provided for wastewater handling or treatment or both. Embodiments can include systems to treat wastewater constituents, with a focus on nutrient removal, such as nitrogen, or phosphorus removal. Embodiments may target nitrogen removal by directing wastewater and perhaps air over treatment media and recirculating captured wastewater back to the front end of the treatment system. This captured wastewater can represent a fraction of the total wastewater treated by the system. For example, embodiments may collect about a half, third, sixth, thirty-six, sixty-fourth, etc. of the total wastewater after it has moved through the treatment media in a leaching field and return this collected wastewater back to the front or an upstream area of the treatment train. Recirculation of collected wastewater may be accomplished by various methods including pumping, by blowing and by partial vacuum. Thus, collected wastewater as well as vapor containing collected wastewater, may be returned upstream into the treatment system in embodiments. In some preferred embodiments recirculation may be accomplished without creation of significant amounts of sludge in the system or considerable maintenance and oversight of system operation by a system operator or a system owner or both. Still further, improved power consumption and improved cold weather performance may be benefits of some embodiments.

In embodiments wastewater from a wastewater source, such as a home, restaurant, storefront, or other location where wastewater is impacted by human activity, may enter a septic tank that can provide for separation and clarification by density of the wastewater. Clarified wastewater may then flow out of the septic tank and enter a leach field. In embodiments this wastewater may then travel downwardly, under the force of gravity, in leaching field and, in certain embodiments, from an induced pressure gradient as well. This pressure gradient may be generated by a blower or vacuum moving air and wastewater downwardly through the treatment media of a leaching field. For example, a vacuum may be used by itself to create the pressure gradient or to supplement a blower when creating pressure gradients in the system that act on wastewater moving in a leach field.

In embodiments, the wastewater may percolate down in a leach field, through 2"-36" or more of a permeable treatment media such as sand, soil and/or a man-made permeable material. In so doing, ammonium may be oxidized into nitrate. Also, other treatment directed to: pathogens, dissolved oxygen, TSS, nitrogen, phosphorus, endocrine disrupters, etc. may also occur by passage through the permeable treatment media in this and other embodiments. After percolating through this treatment media, a percentage of the wastewater in the leach field may be collected in a collector and the remainder may move past the collector into the environment. In embodiments, the wastewater that is retained in the collectors or the liner can be recirculated by a pump, by a blower, by a partial vacuum generated by a blower or by other devices. These recirculators may move the collected wastewater in order to recirculate it back into the treatment system and may also channel the collected wastewater to an exhaust field, a subsequent treatment field, a vent, and combinations thereof. This channeling to an exhaust field or other receiver may be managed such that during periods of time most collected wastewater is recirculated back into the system and that during other times a portion of the collected wastewater is recirculated back with some or all of the remainder being vented or sent to an exhaust field or a subsequent treatment field and combinations thereof. The exhaust field and subsequent treatment field here and in other embodiments may be a sub-surface field as well as a carbon drum or other treatment media field located above or below ground. A traditional centrifugal or submersible pump may be the recirculator used to recirculate the wastewater back to the septic tank or other areas of the treatment system.

In embodiments, a negative pressure gradient may draw methane and carbon dioxide from the septic tank and overlying sand, soil or man-made media in the leaching field or elsewhere, and further help provide a carbon source at the collectors or elsewhere in the system for denitrification.

In embodiments the collector can be a permeable collection device or system as well as an impermeable device or system. Whether the collector is an impermeable pan or permeable collection device, the collector may be configured to cover a broader or narrower area beneath the leaching conduits to adjust the amount of wastewater that may be collected relative to what is allowed to return to the environment. In other words, in embodiments the collector can be a collection device that underlies the entire leaching area or only a portion of the leaching area such that a percentage of the wastewater may be recirculated back to the septic tank or other upstream area of the treatment train and the remaining percentage is allowed to pass to the environment. Moreover, in embodiments, only some of the collected wastewater may be recirculated and the remainder may be discharged to the environment, retained for later recirculation, or stored for subsequent removal and transport away and combinations thereof. Still further, other outcomes may also be possible for collected wastewater.

In embodiments, the wastewater that is collected may be moved into a separator where solids, liquids and gases may be separated. Any liquids that are entrained in an associated gas or as a vapor may collect in the bottom of the separator. The gas fraction may either be returned to atmosphere or to a filter device for removal of odors, greenhouse gases, etc. The liquid, generally wastewater containing nitrate in preferred embodiments, may be returned to the front end of the septic tank, ideally through a spreading device in the septic tank to load the tank uniformly, where the wastewater can react with the microorganisms and carbon fraction of the tank contents, further providing denitrification. The rate that embodiments return wastewater to the front end of the septic tank is preferably slow in order to preferably enhance denitrification. The recirculation rate can be adjusted by the sizing the collectors, recirculator flow rates and recirculator run times and by recirculator sizing and operation.

In embodiments, a configuration of the leach field may use a reduced footprint that limits or eliminates loading of wastewater into trenches that are too close together. In embodiments, alternating trenches may be manifolded together into, for instance, a first grouping or zone and a second grouping or zone, e.g., "A" and "B" groups or zones.

In embodiments, an unlimited number of zones could be utilized (A, B, C, O, . . . Z) with an unlimited number of trenches per zone. In embodiments with A and B trenches, i.e., trenches in both the A and B zones, A trenches may be manifolded together and B trenches may be manifolded together, then these zones may be dosed independently such that wastewater infiltration from the trenches does not compete for the same space in the surrounding soil or only a portion of the same space in the surrounding soil. In operation, the dosing of the A trenches can occur and then, at a later time, the dosing of the B trenches can be subsequently made.

In embodiments, the dosing interval between the A trenches and the B trenches can range from hours to days apart, depending on soils and wastewater characteristics. In embodiments it may be preferred to allow for the individual trenches to fully infiltrate any given dose so as to reduce competition with neighboring trenches. Preferably, the zone dosing intervals may not be set to close together in order to avoid diminished hydraulic capacity, treatment and lifespan. In preferred embodiments, dosing may utilize, for example, the A zone for a week and the B zone for the following week. The one-week rest interval may result in any biomat that has developed while on line to breakdown before going back on line. The rest interval can be adjusted for soils, wastewater and other variables. Still further, dosing intervals between zones can be set by volume of wastewater being treated such that once a threshold of water has passed to a trench leaching zone that zone is not used and a different zone is used until the volume is reached and a subsequent switch can occur. This volume may be on the thousands of gallons and thousands of cubic feet of water, e.g., 1,000; 2,500; and 5,000 per dosing cycle.

In embodiments, dosing can be alternated by opening or closing zone valves, manual adjustment in a distribution box, and by a variety of automated controllers and valves. In certain instances, supplemental air can be directed to the zones to enhance performance. In embodiments, alternating doses to approximately 33%-50% of the available system capacity or rating may increase hydraulic capacity, treatment and lifespan of the system. In other words, in embodiments a portion of the leach field system may alternatively receive doses sized for 33% to 50% of the total system capacity or rating and this reduced dosing may serve to improve hydraulic capacity, treatment, and lifespan of embodiments. Thus, system overdesign can be used in embodiments to promote capacity, treatment, and lifespan.

FIG. 1 is a top view of a treatment system 100 in accord with embodiments. Shown in FIG. 1 are a septic tank 110, a recirculating blower 130, valves 120, 121, 122, 123, 124, 125, 126, and 127, a junction box 155, leach field conduits 170 for zone A and leach field conduits 175 for zone B, clean-outs 165 and 166, return line 138, controller 140, control lines 141, separator 135, vent 150, collector 160, and return line 148. In embodiments, the controller 140 may serve to regulate and control operation of the treatment system 100. This may include sending control signals to or receiving sensor signals from one or more of the valves, the recirculating blower 130, the separator 135, the vent 150, the collector 160, the septic tank 110, and the junction box 155.

As wastewater enters the system 100 into the septic tank 110, wastewater levels may be monitored by the controller 140 at the collector 160, the separator 135, and the junction box 155, and, when a target value is reached the recirculating blower 130 or other recirculation device may be activated such that water captured in the collector 160 may be recirculated back to the junction box 155 through valve 122 and/or through return line 148 and septic tank 110. The target may be set by the amount of water entering the septic tank 110, a gross volume of water to be processed for a period of time, for a certain amount of captured water at the collector versus wastewater entering the septic tank, or for other measurable targets as well. Still further, the recirculation may be set for periods of time and not depend exclusively or partially on volumes of water being treated or captured or both.

As can be seen in FIG. 1, the conduits 170 and 175 may be interspersed amongst themselves in embodiments and flow between them may be toggled by a junction box 155. Thus, depending upon the setting of the junction box 155, wastewater to leach out of the conduits and down towards the collector may flow through either zone of conduits. As can also be seen, each zone may be coupled to a return line 138 that is connected into the separator 135. This return line 138 may be periodically or constantly pressurized by the recirculative blower 130 and/or another recirculator.

In embodiments, the return line 148 may also serve to create bias of wastewater flow in the separator as well as the septic tank 110 and the vent 150 may be regulated to control maximum pressure levels in the separator or to otherwise manage wastewater flow. As shown, a valve 124 may also reside in the vent circuit to facilitate operation and maintenance.

The return line 138 may also serve to create a pressure gradient away from the collector 160 and towards the separator. Thus, not only may vapors and gas from the conduits be recirculated but collected wastewater from the collector may be recirculated as well. Valves 123, 126, and 127 may serve to control recirculation of wastewater, vapors and gas. The valves may also serve to prevent unwanted discharge back into dormant conduits or collectors.

The collector 160 is shown beneath both zones of the conduits 170 and 175. In embodiments bifurcated collectors may also be used where the collectors may be separate from each other and may be configured to receive wastewater leaching from a single zone of conduits. Still further, in embodiments a collector may also be configured to collect wastewater from only a portion of a zone of conduits. In so doing, some wastewater may be returned directly to the surroundings because it is not collected and some wastewater from the leaching conduits may be collected and recirculated back into the system. In embodiments the collector 160 may have a screen, filter fabric, stone or other material serving to further filter wastewater to be recirculated back into the system. The collector 160 may also contain a replenishable carbon source such as wood chips or saw dust or corn husks or corn stalks or combinations thereof for promoting denitrification. Cleanouts, as described elsewhere, may be used to remove and replace the carbon source atop the collector 160.

Figures 2A, 2B:
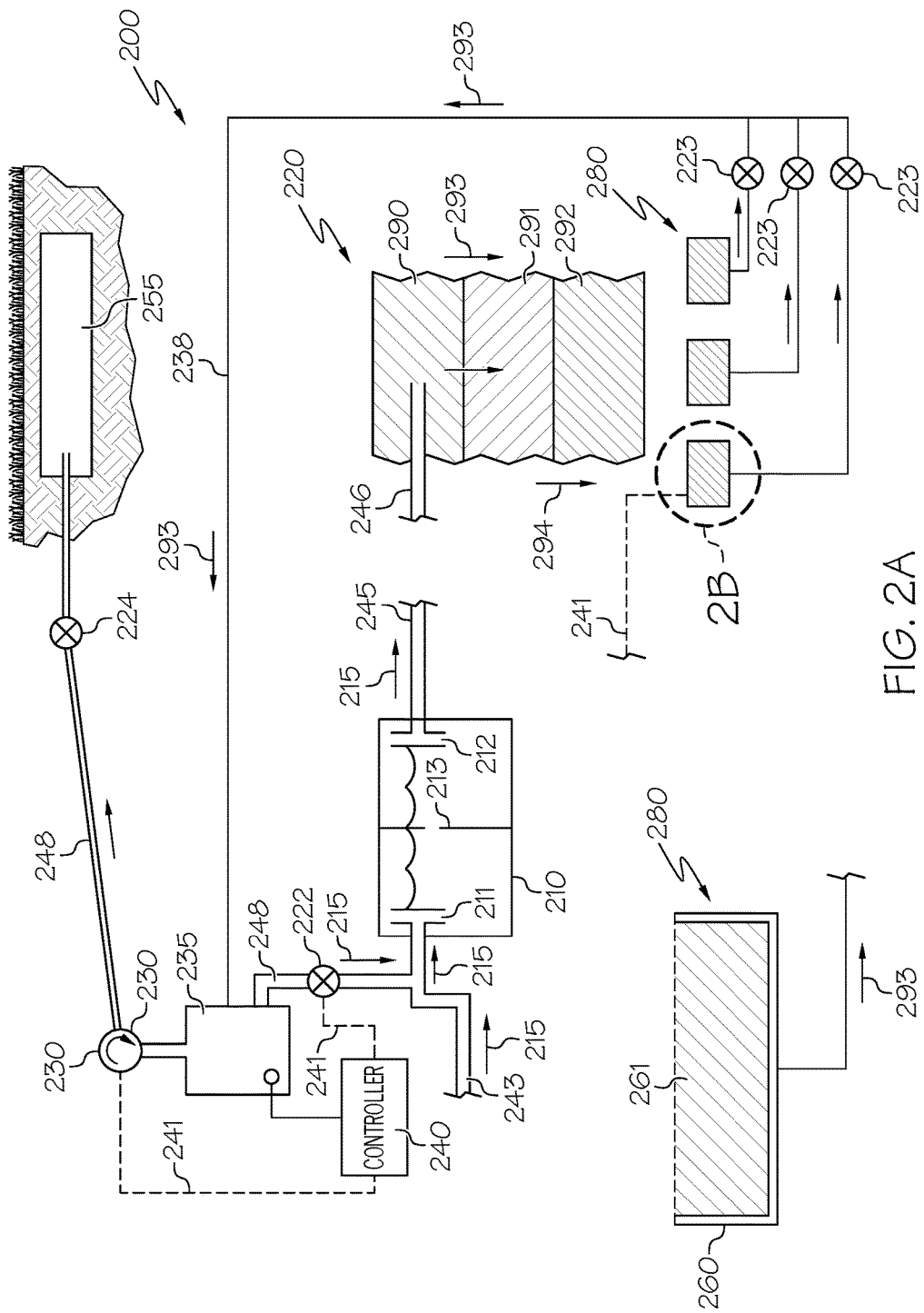
FIGS. 2A-2B show various features of wastewater treatment systems as may be employed in accord with embodiments.

FIG. 2A is a schematic view of a treatment system 200 as may be employed in accord with embodiments. Shown in FIG. 2A is a septic tank 210, inlet baffle 211, sedimentation baffle 213, outlet baffle with optional screen 212, wastewater flow arrows 215, 293, and 294, collector 280, collector wall 260, collector media 261, treatment media layers 290, 291, and 292, valves 222, 223, 224, a recirculator blower 230, separator 235, exhaust field 255, and return line 248. FIG. 2B shows an enlarged collector 280, with a collector wall 260 and collector media 261. The collectors 280 may also include several component layers in embodiments, including a permeable geonet layer and an impermeable lower layer, each of these layers may also contain a collector media 261.

The treatment system 200 may receive wastewater at input 243. This wastewater may include human waste and may be originating at a residence, commercial location, and a plurality of either or both. It may also be an industrial facility or other source of wastewater related to human waste. Upon receipt, and perhaps after an initial screening, the wastewater may enter a septic tank 210 for further clarification. The tank may itself include input baffle 211 and baffle 213 to promote sedimentation and to decrease the solids content of the wastewater leaving the septic tank through output baffle 212. The conduit 245 may be in fluid communication with the conduit 246 whereby the conduit 246 has openings that allow wastewater flowing therein to exit and leach into treatment media layers 290, 291, and 292. These treatment media layers may be comprised of the same material as well as different materials where the different materials may be of decreasing sieve size such that they do not readily mix with each other. Thus, treatment media such as sand, soil and the like may be located above the collectors 280 and, collector media such as wood chips, sawdust, corn stalks, corn husks, or other carbon containing material, may be located within the collectors 280.

As wastewater moves in the direction of arrow 294 it may be treated by microorganisms in the treatment media. Collectors 280 placed below the treatment media may be sized and positioned to intercept a portion or all of the wastewater leaching thought the treatment media. Thus, a percentage for recirculation may be set by having the collectors 280 positioned below only a portion of the leaching conduits in the leaching field.

FIG. 2B shows that the collectors may be configured in a single pan like in FIG. 2B. In embodiments, however, as mentioned above, the collectors may also include other layers where another layer may be more permeable than an outer layer. Still further, in this and other embodiments, a filter fabric may surround or be atop the collector and pea-stone may also be used as a filter positioned above the collector.

Valves 223 may be opened and closed to allow wastewater to be recirculated back to separator 235, where the wastewater may then be redeposited into the septic tank through valve 222 or blown, as vapor and/or entrained in gas, toward exhaust field 255. In operation, wastewater may not be held for extended periods in the separator 235 with the majority of the wastewater being reverted back to the septic tank to be sent again through the tank and treatment media of the leach field 220.

As can be seen in FIG. 2A a controller 240 may monitor levels of the separator 235 and may serve to control blower 230 and valve 222 for purposes of recirculating wastewater from the collectors 280 back into the septic tank or elsewhere in the system 200. Sensors and associated control lines 241 can allow the controller to monitor levels and provide commands to components of the system 200, including wastewater levels in the collectors 280 and the separator 235.

Figure 3A:
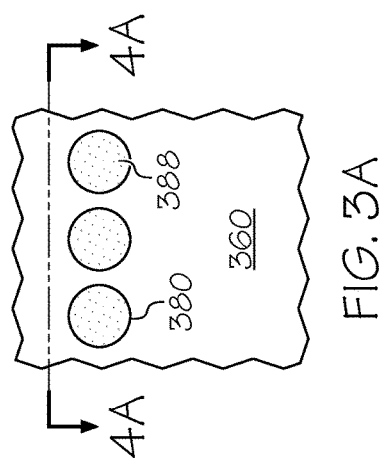
FIGS. 3A-3B show sectional views of subsurface conditions in a leach field as may be employed in accord with embodiments.
Figure 3B:
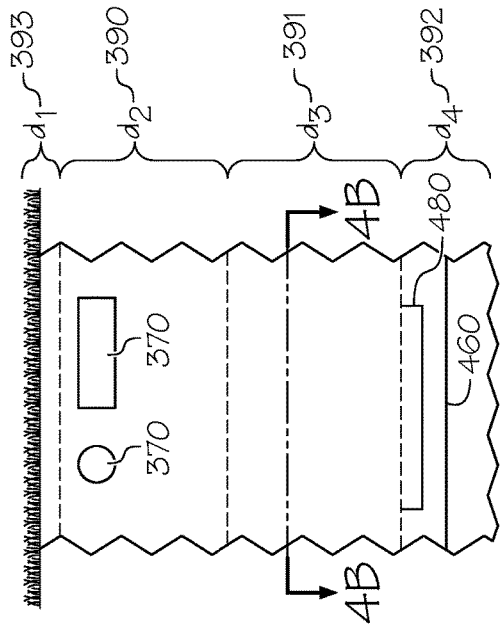
Figure 4A:
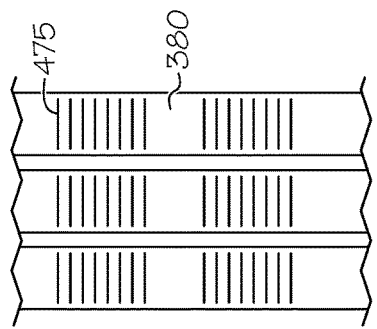
FIGS. 4A-4Bb show top views of collectors from FIGS. 3A-3B as may be employed in accord with embodiments.
Figure 4B:
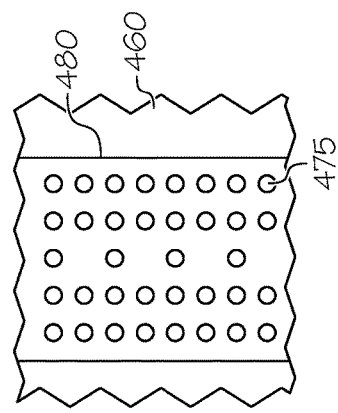

FIGS. 3A and 3B show elevational views of the collectors and layers of the leach field while FIGS. 4A and 4B show top views of collectors along lines 4A-4A and 4B-4B respectively. Consistent with above statements regarding modifications of embodiments, features shown in FIGS. 3A, 3B, 4A, and 4B may be used in the systems shown in FIGS. 1-2, 6, 9-10 and 11A-11B, as well as other embodiments.

Visible in these figures are collectors 380 and 480, liner 460, leaching conduits 370, treatment media 360, and layers 390-393. The collectors labeled 380 are shown with wood chips 388 within them. As can be seen the collectors 380 of FIG. 3A have additional treatment media 360 beneath them. Leaching conduits, which are not shown in FIG. 3A, may send water downward towards collectors 380, where some of the wastewater may enter the collectors 380 and some wastewater may continue past, down into further treatment media 360. Thus, in embodiments, the collectors may be configured to only capture a certain portion of wastewater leaching from the leaching conduits. Comparatively, the collector 480 is shown in FIG. 3B beneath the leaching conduits 370 such that the vast majority if not all of the wastewater from the conduits 370 will be intercepted by the collector 480 and later by the liner 460 for overflow.

FIG. 3B also indicates distances of depths below surface for each of the leaching conduits, the treatment media 391, and the collector 480 and liner 460. In embodiments, the depth d1 393 may be on the order of six inches to two feet while the thickness of media 390, distance d2 may be three inches to four feet, and the thickness of media 391 d3, may be three inches to five feet or more in thickness. In preferred embodiments d2 and d3 may be comprised of the same material and would cumulatively be on the range of six inches to four feet in thickness. Thus, the invert elevation of the top of the collector may be about eight inches to ten feet or more below grade. It may be deeper as well, especially if the recirculation system is used in a commercial or industrial system where longer treatment distances through the media are utilized or needed.

In FIG. 3B, the leach field conduits are labeled 370 and are positioned above or in layers 390, 391, and 392. As can be seen the conduits 370 can have different cross sections. Likewise, the collectors 380, 480 may have different opening to receive water from above. FIG. 4A shows the openings 475 as slots while FIG. 4B shows the openings 475 as circles and ovals. Also visible in both figures is that the openings may be uniformly and nonuniformly spaced along the length and width of the collectors. Still further, in embodiments the spacing of openings in a collector may be uniform across the entire width of the collector and in embodiments the openings may be nonuniformly spaced across the width as well. Likewise, openings may be uniformly and nonuniformly spaced along the length of the collectors. The collectors may also have screens, stone, filter fabric, combinations thereof, and other covers to limit particulate size being captured. Still further, collectors may also be open pans, where all material may be collected therein without traveling through an upper cover or the like.

Wood chips or other carbon source in the collectors may be replaceable such that periodically new wood chips or other media such as saw dust, corn husks, corn stalks, or other carbon containing material may be placed in the collector. This collector media in the collectors themselves may serve to further treat the water passing through and being recirculated by the treatment system.

FIGS. 5A and 5B show additional leach bed layering and conduit positioning as may be employed in embodiments. Consistent with above statements regarding modifications of embodiments, features shown in FIGS. 5A and 5B may be used in the systems shown in FIGS. 1-2, 6, 9-10 and 11A-11B, as well as other embodiments. Leaching conduits are labeled 570, the collectors are labeled 580 and the layers are numbered 590, 591, 592, and 593. As can be seen, the conduits 570 may have uniform cross-sections and may be buried at similar invert elevations. Likewise, the collectors 580 and liners 560 may be positioned directly below the collectors with uniform thicknesses of media between them. Still further, the media bed may be comprised of three materials with a first material surrounding the leaching conduits, a second material below and a third material surrounding or atop the collectors and liners. These materials may be the same material or different materials in embodiments.

Figure 6:
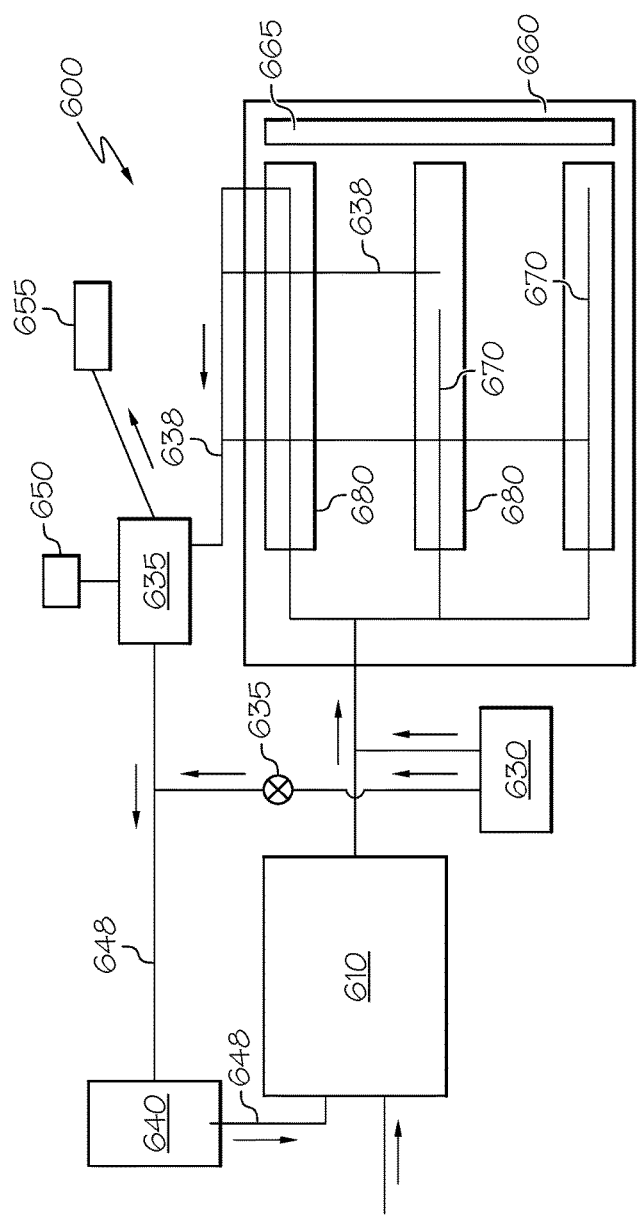
FIG. 6 is a plan view of a schematic of a wastewater treatment system as may be employed in accord with embodiments.

FIG. 6 shows a top view of a treatment system 600 as may be employed in accord with embodiments. Visible in FIG. 6 are the septic tank 610, the recirculator blower 630, collectors 680, leach field conduits 670, clean out 665, membrane liner 660, separator 635, vent 650, exhaust field 655, controller 640, return line 638 and return line 648. The system 600 is shown with a recirculative blower 630 connected to positions upstream and downstream of the septic tank 610. In so doing a biasing force may be drawn on line 638 and on the separator 635. Shutting the valve 635 can force more exhaust gas flow to the exhaust field and vent 650 while opening the valve 635 may induce more exhaust flow back towards the septic tank 610. The clean out 665 is shown to be in an elongated configuration atop the membrane liner 660. In so doing treatment media atop the liner may be removed and reintroduced above the liner for the system. In other words, if wood chips or saw dust or other collector media is atop the liner and below the collectors or in the collectors, this media may be readily removed and replaced because of the access provided by the cleanout 665. As can also be seen in FIG. 6, the leaching conduits 670 are each manifolded to the return line 638 and at least one of the collectors is also shown being manifolded to the return line 638. Thus, a biasing force may also be placed on the collectors in this and other embodiments. This biasing force can promote removal of the wastewater in the collectors as well as possible treatment of any media in the collector.

Still further, the leaching conduits, as shown in FIG. 6, may not extend the full length of the collectors in order to manage volumes of wastewater recirculation and in order to direct where overflow into the liner is more likely to occur. In other words, the absence of a leaching conduit above a collector may make that portion of the collector less likely to overflow wastewater down to the liner in that area. This reduction in wastewater flow down to the liner may be preferred near the liner edge, at cleanout locations, or at other locations where less retained wastewater at the liner level is advantageous for monitoring, pumping, or maintenance of the system. As explained above, the features shown in FIG. 6, including the elongated cleanout trench 665 may also be used in the other systems depicted in the other figures provided herein as well as still other embodiments consistent with the teachings herein. Also, rather than have the collectors extend well beyond the leaching conduits as described above, the collectors and liners may only be under a portion of the leaching conduits so as to recirculate only a percentage of wastewater and such that noncollected wastewater may be allowed to pass to the surrounding environment.

Figure 7:
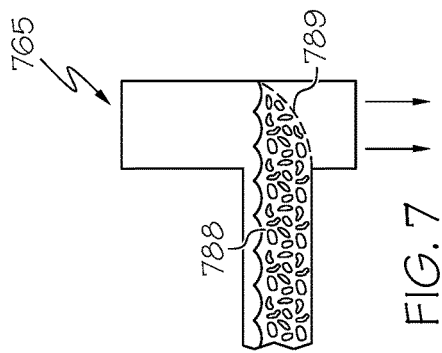
FIG. 7 shows a sectional view of a cleanout as may be used for a collector or other wastewater treatment system feature in accord with embodiments.

FIG. 7 shows a side view of a cleanout 765 as may be employed in embodiments. This cleanout 765 is shown with wood chips 788 and an elbow screen 789. The wood chips or other collector media may be resident in embodiments in the collectors as well as above liners. Other treatment media including granular media, absorption media, etc. may also be accessible and removed and replaced through cleanouts in the systems disclosed herein. The screen 789 may be sized in embodiments to allow wastewater to pass but to retard or prevent the collector media, such as wood chips, from passing. In so doing, drainage may occur while retaining the majority or all of the treatment media in the collectors or above the liner or both. As explained above, the features shown in FIG. 7, including the screen 789, may also be used in the other embodiments depicted in the other figures provided herein as well as other embodiments consistent with the teachings herein.

Figure 8:
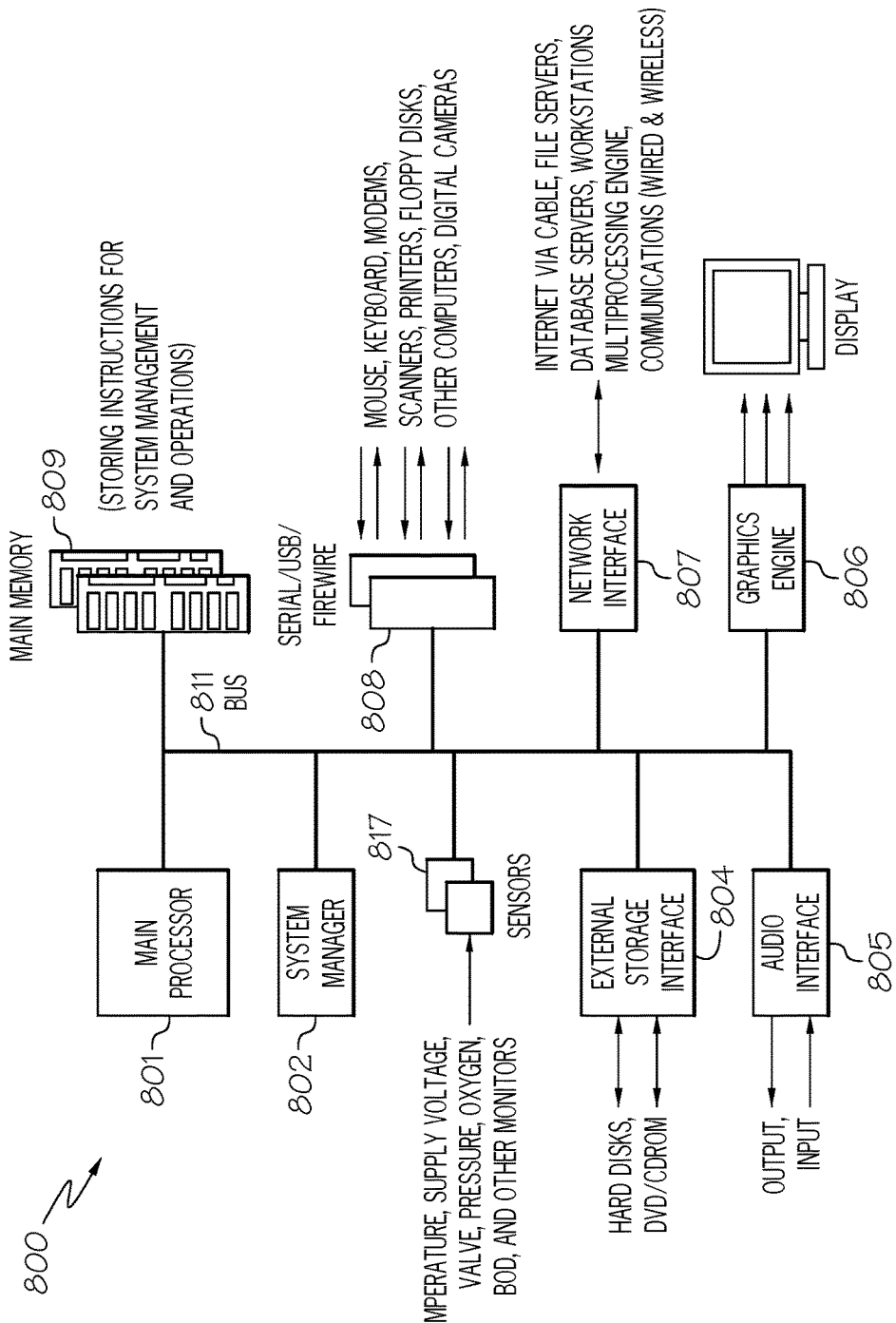
FIG. 8 shows a schematic of a system controller as may be employed in accord with embodiments.

FIG. 8 is a schematic view of a controller 800 as may be employed in embodiments. The controller 800 is shown with a bus 811 in communication with a main processor 801, a system manager 802, sensors 817, an external storage interface 804, an audio interface 805, main memory 809, serial/USB/Firewire communication ports, network interface 807, and graphics engine 806. In use, the main memory 809 may store instructions for carrying out processes, such as those specifically described in this disclosure. These instructions can include instructions for monitoring the sensors and providing system commands to operate pumps, blowers, vacuums, valves, and gas sources used in embodiments. When sensors indicate that threshold pressures have been reached the controller may send commands to a recirculator to stop. Likewise, if nitrogen levels, wastewater levels or other sensed targets are sensed to be high, recirculators may be activated such that the wastewater or vapor or gas may be changed in the septic tank, the lines, the collectors, the distribution box, the separator, or elsewhere in the treatment system. The controller may provide for programming or adjustment by a user, such as a system administrator or home owner. These adjustments can include setting variations for dosing time, dosing intervals, pH levels, alert preferences, wastewater levels in the collectors or elsewhere, and for other things as well. In embodiments, these alerts can be sent over a network such that a home owner, industrial plant operator, or other user may be alerted of the status of the treatment system. These status alerts can include providing notice of the dosing time, dosing intervals, pH levels, pressure, oxygen, temperature, treatment media condition, and supply voltage of components of the treatment. These alerts may be sent over a network and may be received by a user's phone, tablet computer, or other computing device.

Figure 9:
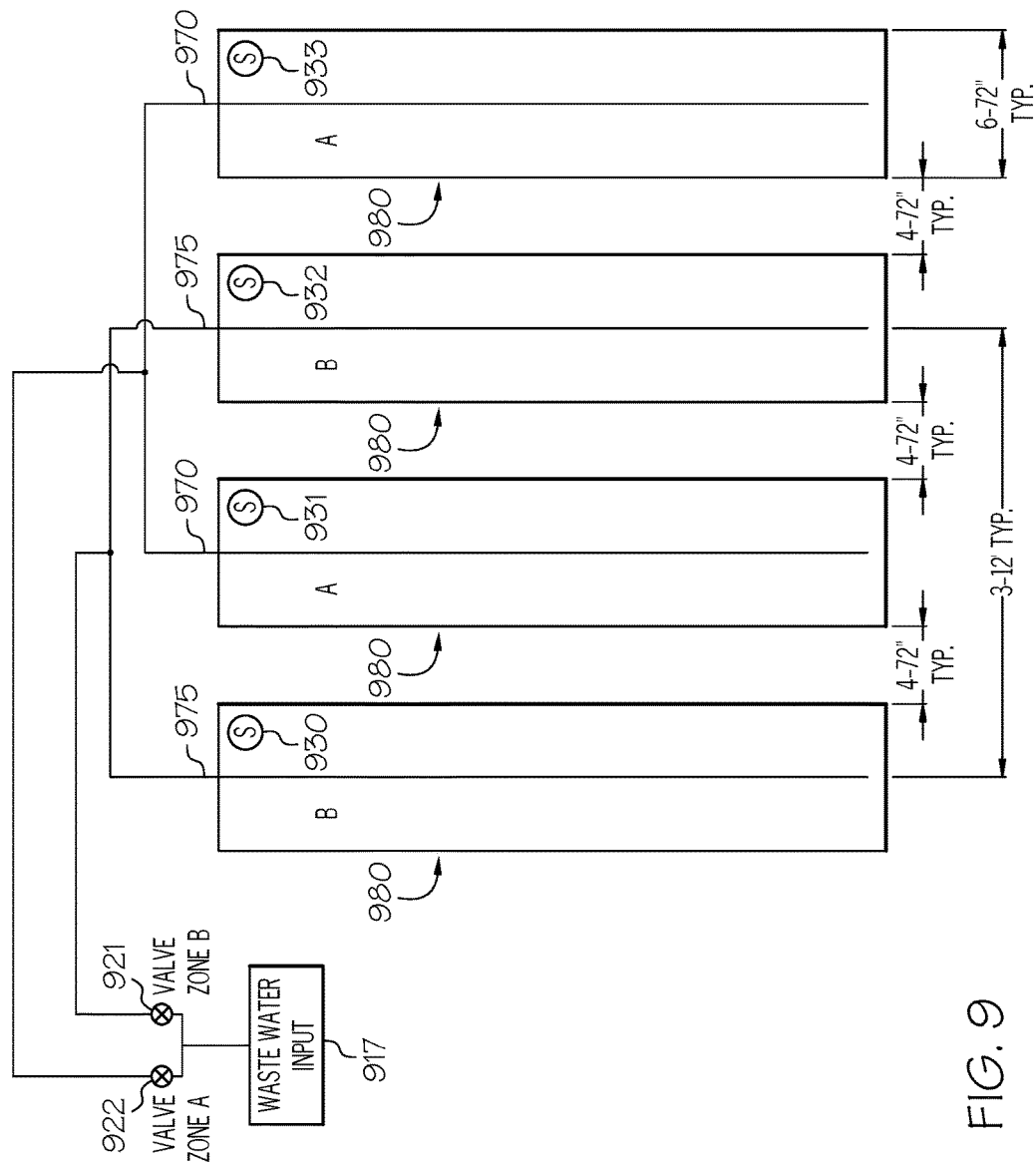
FIG. 9 is a plan view of a schematic of a wastewater treatment system as may be employed in accord with embodiments.

FIG. 9 shows a top view of alternating leach fields as may be employed in embodiments. Shown in FIG. 9 are valves 921 and 922, collectors 980, and leach field conduits 970, 975. The spacing of the collectors and the conduits is also shown on FIG. 9. Valve 921 is shown to regulate zone B while valve 922 is shown to regulate zone A. Typical spacing between the leaching systems is also shown in FIG. 9. This spacing includes from about three feet to about twelve feet between leaching conduits of the same zone and about four inches to about seventy-two inches for collectors or leaching conduits of different adjacent zones. Other spacing may also be used in embodiments.

Sensors 930-933 are also shown in FIG. 9. These sensors may be used to detect changing properties of the treatment media, the collectors, wastewater levels, and other properties. Sensed or measured properties can include depth of water, moisture content, moisture content of treatment media, ambient gas composition and percentages of target gases including for example carbon dioxide and oxygen etc. Thus, a controller monitoring one or more of the sensors can consider sensed readings and target values for those sensed properties and operate the system to within system tolerances. For example, if the moisture level of the treatment media is too low, the flow rate of wastewater to the conduits may be increased or the recirculator flow rate may be reduced or another variable maybe adjusted to reach a target moisture level.

Figure 10:
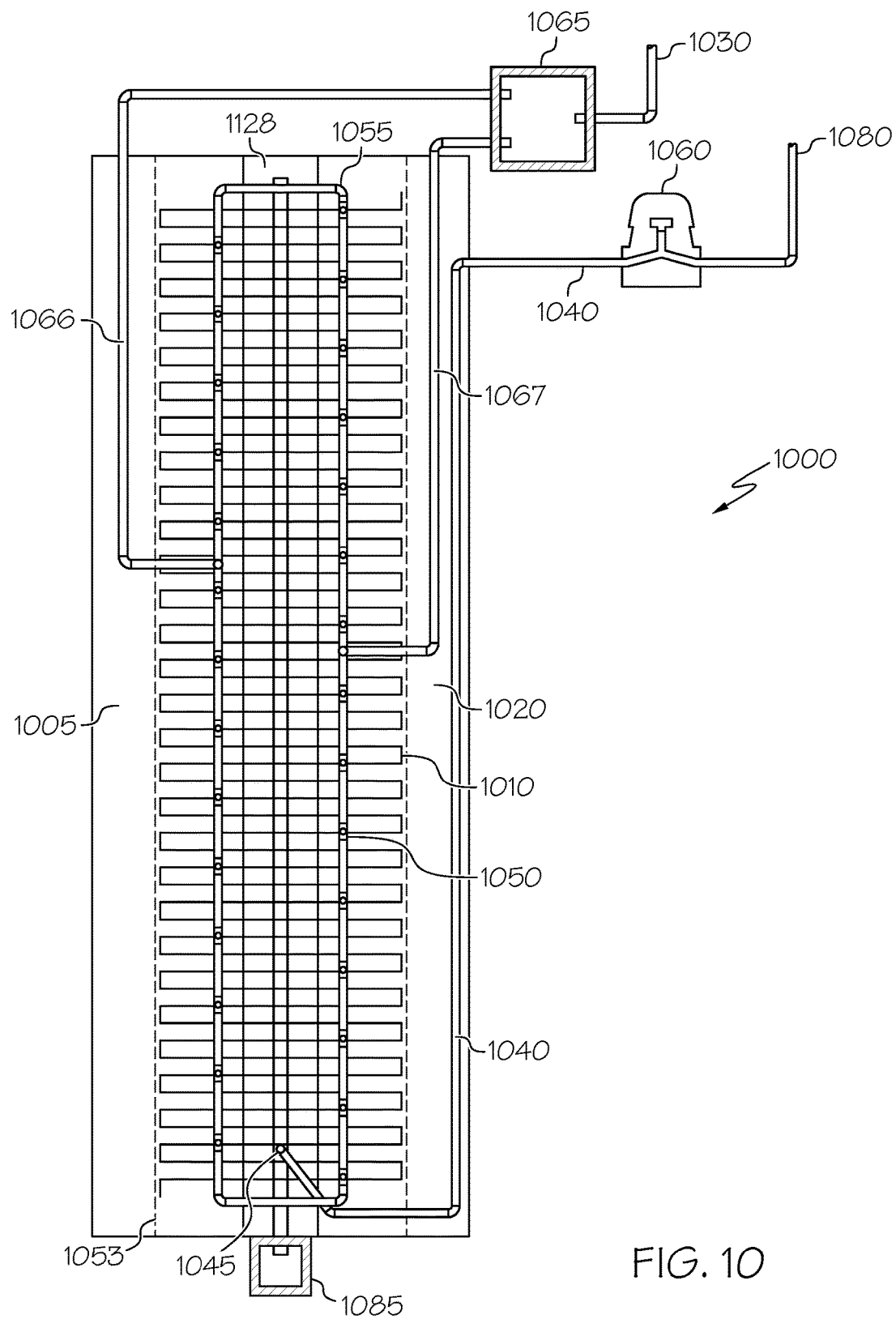
FIG. 10 is a plan view of a wastewater treatment system as may be employed in accord with embodiments.

FIG. 10 shows a plan view of a wastewater treatment system 1000 as may be employed in embodiments. Visible in FIG. 10 is a wastewater system with a serpentine leaching conduit having u-shaped portions. This conduit may be comprised of GEOU 1272 as well as other materials such as connected rectangular or other polygonal channels with lower perforations, a granular or other porous material wrapped in filter fabric, and combination and variations of these examples.

Figure 11A:
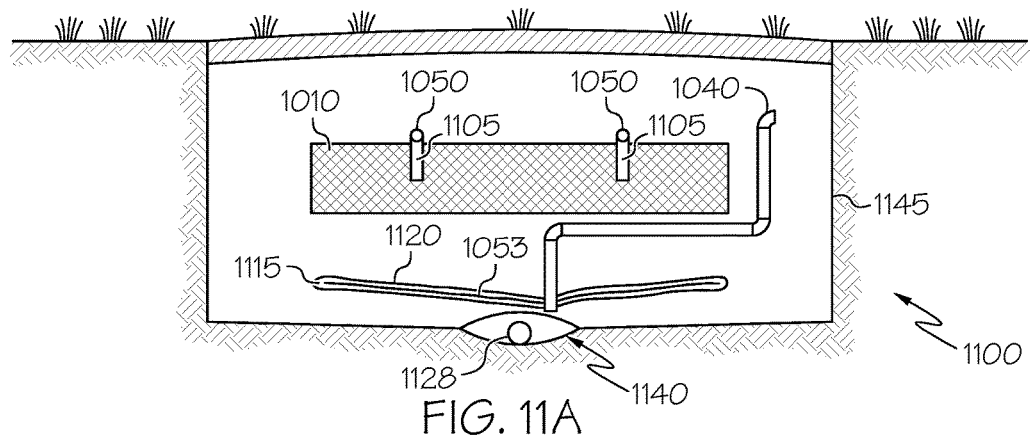
FIG. 11A is a sectional view through the wastewater treatment system of FIG. 10 as may be employed in accord with embodiments.

The conduit 1010 is shown positioned in a serpentine fashion above a collector and a liner, the collector 1053 sits below the conduit and is shown with dashed lines 1053. As can be seen in FIG. 11A the collector 1053 may be covered atop and below by a Geomat 7800 and this combination of materials (Geomat 7800, collection liner, and Geomat 7800) may be wrapped in a filter fabric 1120. This first collector may extend out as far as the edges of the u-shaped turns of the leaching conduit 1010 and may be non planar in order to direct water or other leachate towards a collection sump 1140 for returning wastewater back into the system. The pipe 1040 in FIG. 10 is shown at 1045 to be positioned in a sump area of the first collector. This pipe 1040 may be routed through a vent 1060 to manage pressure in the line or otherwise vent vapor/gases to atmosphere. The pipe 1040 is also shown at 1080 being connected back to the head of the septic tank or other system entry point. Wastewater travelling back to the system entry port may also flow through a distribution spreader bar.

A treatment material 1020, comprising sand or soil or other material, may be placed around, below, and above the leaching conduit 1010, the collector 1053 and the liner 1005. This material 1020 may serve as a treatment media for wastewater leaching out of the leaching conduit 1010. The material 1020 may facilitate treatment of the wastewater and the leaching conduit 1010 may be fed from above by supply pipes 1066 and 1067. These supply pipes may supply tees 1050 positioned above or adjacent to the leaching conduit. As can be seen in FIG. 10, the supply tees 1050 may be spaced and positioned to coincide with every other leaching conduit along segments of the leaching conduit. Other spacing and relative positions between the supply tees and the leaching conduit may also be used. Still further, the supply pipes 1066 and 1067 may be fed from a distribution box 1065 that is itself fed from a supply line 1030. The distribution box may send equal or differing amounts of wastewater to each of the supply lines and may also be configured to regulate flow between the supply lines 1066 and 1067 depending on time, flow rate or other variable.

The liner 1005 may itself be pitched, creased, or otherwise biased to flow any collected wastewater towards a sampling port sump 1085. The liner 1005 may be impervious or partially permeable to allow some water to pass through to the environment. The sampling port 1085 may be monitored manually as well as automatically to determine the effectiveness and status of the wastewater in the system 1000. The sampling may be used to determine recycling rate and if additional carbon was necessary.

In use, a blower or vacuum or other recirculator may be coupled to the return line 1040 to promote recirculation of wastewater from the collector 1053 back to the beginning input of the system. A target recirculation rate can provide for improved wastewater discharge quality.

FIG. 11A shows a sectional view of the wastewater treatment system of FIG. 10. The supply lines and supply tees 1050 are shown atop the leaching conduit 1010. As can be seen an anchor 1105 may be used to align and hold the supply tees 1050 to the leaching conduit 1010. Also visible is that the collector 1053 is angled with a center crease has a GEOMAT 7800 above the collector and a GEOMAT 7800 layer below the collector 1053. Also visible is that the collector and GEOMAT are wrapped in a filter fabric 1120. This combination of materials serves to capture wastewater traveling down from the leaching conduit 1010 and to allow at least some of it to be captured and returned via pipe 1040. As described throughout, a pressure gradient may be placed on the pipe 1040 to draw water into the pipe and promote its movement towards the entrance of the leaching system.

A collection liner 1145 is also visible in FIG. 11A. As can be seen the collection liner 1145 may be at the outer boundary of the leaching system and may include a collection line/sump 1128 and sampling port for measuring system output and for maintaining system operation. Thus, embodiments show how a collector 1053 may be used to retain wastewater after it passes through a treatment media, such as sand or soil. This collector 1053 may have a return sump 1140 that allows wastewater to be piped away and recirculated back into the system. Another liner 1145 may serve as a safety liner that retains errant precipitate for the system and whereby the efficiency of the entire system can be measured through sampling in a sump or other location.

Still further, the layer of the GeoMat™7800 1115 in FIG. 11A, or in other embodiments, can function to collect the wastewater that is infiltrating though the sand or overburden or overlying material, provide additional treatment to the wastewater and transfer the wastewater further below to an accumulating collector 1053. The substantially horizontal layers of GeoMat™, above and below the collector 1053 may be functioning or serving as a secondary treatment system below the collector 1053 and as a collection and recirculation system above the collector 1053 and beneath the pictured serpentine leaching conduits 1010.

Still further in embodiments, a carbon source, such as woodchips or charcoal or methanol or the like may be used to further denitrify recirculated water. In embodiments, the woodchips, charcoal, etc. may be loaded with wastewater at the collector or elsewhere to maintain moisture or saturation of the woodchips by the wastewater being treated. In other words, an anoxic state is preferably maintained in the carbon source, here wood chips.

Figure 11B:
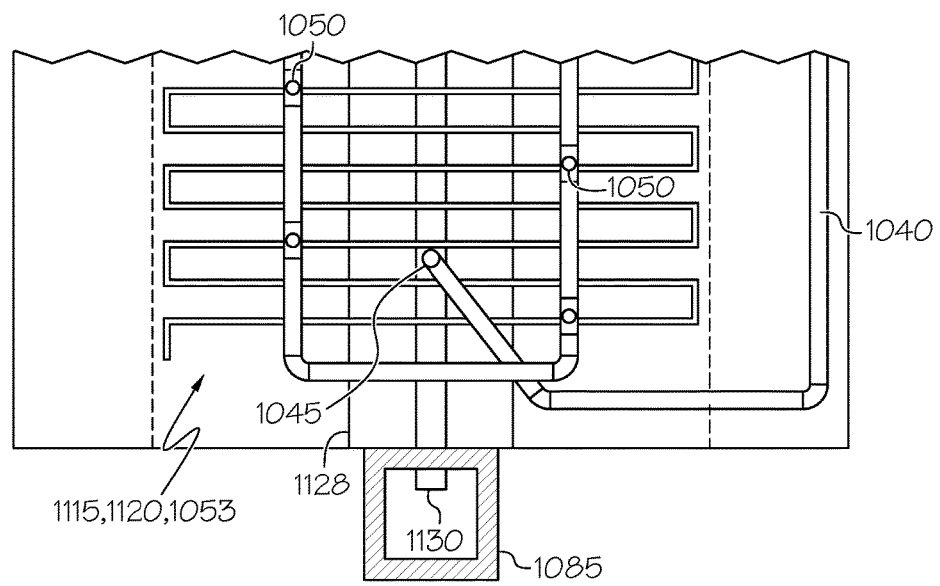
FIG. 11B shows an enlarged end section plan view of the wastewater treatment system of FIG. 10 as may be employed in accord with embodiments.

FIG. 11B is a top view of an end of the leaching system of FIG. 10. As can be seen, the leaching conduit may contain an open structure to allow wastewater flow there through and the supply tees 1050 may align with the tops of the conduit 1010. Also visible is the line/sump 1128 running along the length of the system at the invert elevation of the second liner 1145. The edges of the first collection liner (1115, 1120, and 1053) are marked by the dotted lines. The top view of FIG. 11B shows how a sampling port 1130 may be positioned to receive samples from the treatment system and where a return sump may be located in the system 1000.

As explained above, the features shown in FIGS. 11A and 11B may also be used in the other embodiments depicted in the other figures provided herein as well as other embodiments consistent with the teachings herein.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be computer storage medium readable by a computer system and encoding computer program instructions for executing a computer process.

The corresponding structures, material, acts, and equivalents of all means or steps plus function elements in the claims are intended to include any structure, material or act for performing the function in combination with other claimed elements as specifically claimed. The description of the embodiments of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

Embodiments may also include wastewater that has partially or fully passed through a septic or wastewater treatment system leach field or a drain field and may be recovered and recirculated back to the starting point or an upstream point of the same system. The wastewater may be septic wastewater and the recirculation point may be the septic tank, other wastewater treatment devices are also applicable. The capture of wastewater to be recirculated may be made using soils of different porosities and may be accomplished by using a liner below the septic field. Also, the leach field may be a sand filter or may be a septic leach field and recirculation may be accomplished through the use of a vacuum to collect the wastewater for recirculation. A percentage of the wastewater may be collected for recirculation through the system.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Still further, features shown in the various figures may be incorporated in the various figures consistent with the disclosure. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A water treatment system comprising:
   a leaching conduit configured for receiving and distributing wastewater previously impacted by human activity;
   a treatment media, the treatment media receiving wastewater from the leaching conduit, the treatment media having a permeability allowing the received wastewater to be able to move through the treatment media, the treatment media formed as a below-grade leach bed layer positioned below the leaching conduit, the treatment media configured for treatment and percolation of the received wastewater;
   a region of increased permeability receiving wastewater from the treatment media, the region of increased permeability having a permeability higher than the permeability of the treatment media; and
   an impermeable layer within at least a portion of the region of increased permeability,
      where the impermeable layer is shaped to capture and collect all or a portion of the wastewater from the leaching conduit, and
      where the impermeable layer is shaped to allow wastewater from the leaching conduit to collect in and then overflow the impermeable layer and flow into an underlying region for further percolation.

2. The water treatment system of claim 1 where the wastewater is wastewater comprising human waste and the treatment media is sand or soil.

3. The water treatment system of claim 1 where the impermeable layer is completely within the region of increased permeability.

4. The water treatment system of claim 1 where the underlying region has permeability lower than the permeability of the region of increased permeability and wherein the treatment media is formed as a below-grade leach bed layer positioned completely below the leaching conduit.

5. The water treatment system of claim 1 where the impermeable layer is positioned to capture only a portion of the wastewater received by the treatment media from the leaching conduit.

6. The water treatment system of claim 1 where the impermeable layer includes a collector media providing a source of carbon for denitrification.

7. A water treatment system comprising:
   a treatment train followed by a leaching system for water previously impacted by human activity;
   an underlying layer of soil, sand or natural permeable treatment media or man-made media below the leaching system; and
   an underlying region, below the leaching system and comprising a first permeable layer above an impermeable layer and a second permeable layer below the impermeable layer, the first and second permeable layers in fluid communication with each other; wherein the impermeable layer is configured to catch and recirculate a portion of water previously percolated through the underlying layer to the treatment train upstream of the leaching system and is configured to discharge for infiltration the remaining unrecirculated caught water.

8. The water treatment system of claim 7 where the wastewater is wastewater comprising human waste and the treatment train includes a septic tank.

9. The water treatment system of claim 7 where the caught and recirculated wastewater has a reduced amount of nitrogen in the wastewater than wastewater entering the treatment train.

10. The water treatment system of claim 7 further comprising a liner positioned underneath the impermeable layer, the liner also below a majority or all of the leaching system.

11. The water treatment system of claim 10 where the liner is continuous and impermeable to wastewater.

12. The water treatment system of claim 10 where the underlying region includes a plurality of impermeable layers configured to catch and recirculate a portion of water previously percolated through the underlying layer to the treatment train upstream of the leaching system and configured to discharge the remaining unrecirculated caught water.

13. The water treatment system of claim 12 where the plurality of impermeable layers is positioned apart from each other and below portions of the leaching system.

14. The water treatment system of claim 7 where the underlying region has a sump to facilitate recovery of wastewater back into the treatment train.

15. The water treatment system of claim 7 where the impermeable layer is positioned and configured such that wastewater is removed from it and fed back to the treatment train by a remote recirculator.

16. The water treatment system of claim 15 where the volume of wastewater fed back is less than 10 gallons per minute.

17. The water treatment system of claim 7 where the first permeable layer and the second permeable layer each comprise geotextile mat.

18. The water treatment system of claim 17 where the geotextile mats comprise a polymer.

19. The water treatment system of claim 7 where the impermeable layer includes a collector media providing a source of carbon for denitrification.

* * * * *